United States Patent
Smigelski, Jr. et al.

(10) Patent No.: US 12,330,120 B2
(45) Date of Patent: *Jun. 17, 2025

(54) SPIRAL WOUND MEMBRANE ELEMENT FOR HIGH TEMPERATURE FILTRATION

(71) Applicant: BL Technologies, Inc., Minnetonka, MN (US)

(72) Inventors: Paul Michael Smigelski, Jr., Niskayuna, NY (US); David Olson, Minnetonka, MN (US); Rachel Gettings, Niskayuna, NY (US); Jack Howson, Niskayuna, NY (US); David Moore, Niskayuna, NY (US); Deborah De La Cruz, Vista, CA (US); Hua Wang, Niskayuna, NY (US); Joel Caraher, Niskayuna, NY (US)

(73) Assignee: BL Technologies, Inc., Minnetonka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/110,634

(22) Filed: Feb. 16, 2023

(65) Prior Publication Data

US 2023/0191333 A1 Jun. 22, 2023

Related U.S. Application Data

(63) Continuation of application No. 16/961,906, filed as application No. PCT/US2019/017271 on Feb. 8, 2019, now Pat. No. 11,607,649.

(Continued)

(51) Int. Cl.
*B01D 63/10* (2006.01)
*B01D 61/02* (2006.01)
(Continued)

(52) U.S. Cl.
CPC .......... *B01D 63/103* (2013.01); *B01D 61/02* (2013.01); *B01D 67/0009* (2013.01);
(Continued)

(58) Field of Classification Search
CPC .. B01D 63/103; B01D 61/02; B01D 67/0009; B01D 69/1071; B01D 69/1251;
(Continued)

(56) References Cited

U.S. PATENT DOCUMENTS

| 6,565,747 B1 | 5/2003 | Shintani et al. |
| 8,940,169 B2 | 1/2015 | Goebel et al. |

(Continued)

FOREIGN PATENT DOCUMENTS

| CN | 102309930 A | 1/2012 |
| CN | 103140276 A | 6/2013 |

(Continued)

OTHER PUBLICATIONS

Al-Mutaz, I.S. et al., "Performance of Reverse Osmosis Units at High Temperatures", IDA World Congress on Desalination And Water Reuse, Bahrain, Oct. 26-31, 2001.

(Continued)

*Primary Examiner* — Waqaas Ali

(57) ABSTRACT

A spiral wound membrane module is suitable for use with high temperature water that may also have a high pH, for example steam injection produced water. The module uses a membrane with a polyphenylene sulfide (PPS) backing material. The feed spacer of the module may be made from polyphenylene sulfide (PPS) or ethylene chlorotrifluoroethylene (ECTFE). The permeate carrier may be made of a woven nylon (i.e. nylon 6, 6) fabric coated with high temperature epoxy. The core tube and anti-telescoping device may be made of polysulfone. In some examples, the module may be used at a temperature of up to 130° C.

(Continued)

Optionally, the module may be used at a pH of 9.5 or more. In a filtration method, the module may be operated at a pressure in the range of 150 to 450 psi. The module may be operated at a generally constant pressure.

20 Claims, 1 Drawing Sheet

Related U.S. Application Data

(60) Provisional application No. 62/629,286, filed on Feb. 12, 2018.

(51) Int. Cl.
  *B01D 67/00* (2006.01)
  *B01D 69/10* (2006.01)
  *B01D 69/12* (2006.01)
  *B01D 71/56* (2006.01)

(52) U.S. Cl.
  CPC ..... *B01D 69/1071* (2022.08); *B01D 69/1251* (2022.08); *B01D 71/56* (2013.01); *B01D 2313/143* (2013.01); *B01D 2325/22* (2013.01); *B01D 2325/28* (2013.01); *B01D 2325/30* (2013.01)

(58) Field of Classification Search
  CPC .............. B01D 71/56; B01D 2313/143; B01D 2325/22; B01D 2325/28; B01D 2325/30; B01D 2313/14; B01D 63/10
  See application file for complete search history.

(56) References Cited

U.S. PATENT DOCUMENTS

| | | | | |
|---|---|---|---|---|
| 11,607,649 | B2* | 3/2023 | Smigelski, Jr. | ........ B01D 61/02 |
| 2007/0039885 | A1* | 2/2007 | Kurth | ........ B01D 71/66 210/639 |
| 2010/0078378 | A1* | 4/2010 | Yaeger | ........ B01D 63/103 210/457 |
| 2012/0228219 | A1* | 9/2012 | Goebel | ........ B01D 63/106 210/639 |
| 2013/0220915 | A1 | 8/2013 | Chikura et al. | |
| 2017/0291143 | A1* | 10/2017 | Zhou | ........ B01D 69/12 |

FOREIGN PATENT DOCUMENTS

| | | |
|---|---|---|
| CN | 106573205 A | 4/2017 |
| EP | 1044718 A2 | 10/2000 |
| JP | 2000354742 A | 12/2000 |
| JP | 2009504883 A | 2/2009 |
| JP | 2009202076 A | 9/2009 |
| JP | 2011025110 A | 2/2011 |
| JP | 2012504041 A | 2/2012 |
| JP | 2012066239 A | 4/2012 |
| JP | 2012076002 A | 4/2012 |
| JP | 2014532546 A | 12/2014 |
| WO | 2012122207 A1 | 9/2012 |

OTHER PUBLICATIONS

Chinese Patent Application No. 201980012821.8, Office Action dated Aug. 1, 2022.
Chinese Patent Application No. 201980012821.8, Office Action dated Feb. 8, 2022.
Chu, H.C. et al., "High-temperature reverse osmosis membrane element", Desalination 70 (1988) 65-76.
Franks, et al., "Performance of a Reverse Osmosis System when Reclaiming High pH—High Temperature Wastewater", Hydranautics Technical Paper, available online at https://membranes.com/wp-content/uploads/Documents/Technical-Papers/Product%20line/RO/Performance-of-RO-when-Reclaiming-High-pH-High-Temperature-Wastewater-1.pdf, downloaded Jun. 21, 2021. pp. 1-16.
Hayatbakhsh et al., "Treatment of an in situ oil sands produced water by polymeric membranes", Desalination and Water Treatment, 57 (2016) 14869-14887.
International Application No. PCT/US2019/017271, International Preliminary Report on Patentability dated Aug. 27, 2020.
International Application No. PCT/US2019/017271, International Search Report and Written Opinion dated Apr. 29, 2019.
Japanese Patent Application No. 20200543027, Office Action dated Dec. 6, 2022.
Liang, C.H., "Separation properties of high temperature reverse osmosis membranes for silica removal and boric acid recovery", Journal of Membrane Science. 246 (2005) 127-135.
Manttari, M. et al., "Effect of temperature and membrane pre-treatment by pressure on the filtration properties of nanofiltration membranes", Desalination 145 (2002) 81-86.
Sadrzadeh et al. "Nanofiltration of oil sands boiler feed water: Effect of pH on water flux and organic and dissolved solid rejection" Separation and Purification Technology, 141 (2015) 339-353.
Snow, M. et al., "New techniques for extreme conditions: high temperature reverse osmosis and nanofiltration", Desalination 105 (1996) 57-61.

* cited by examiner

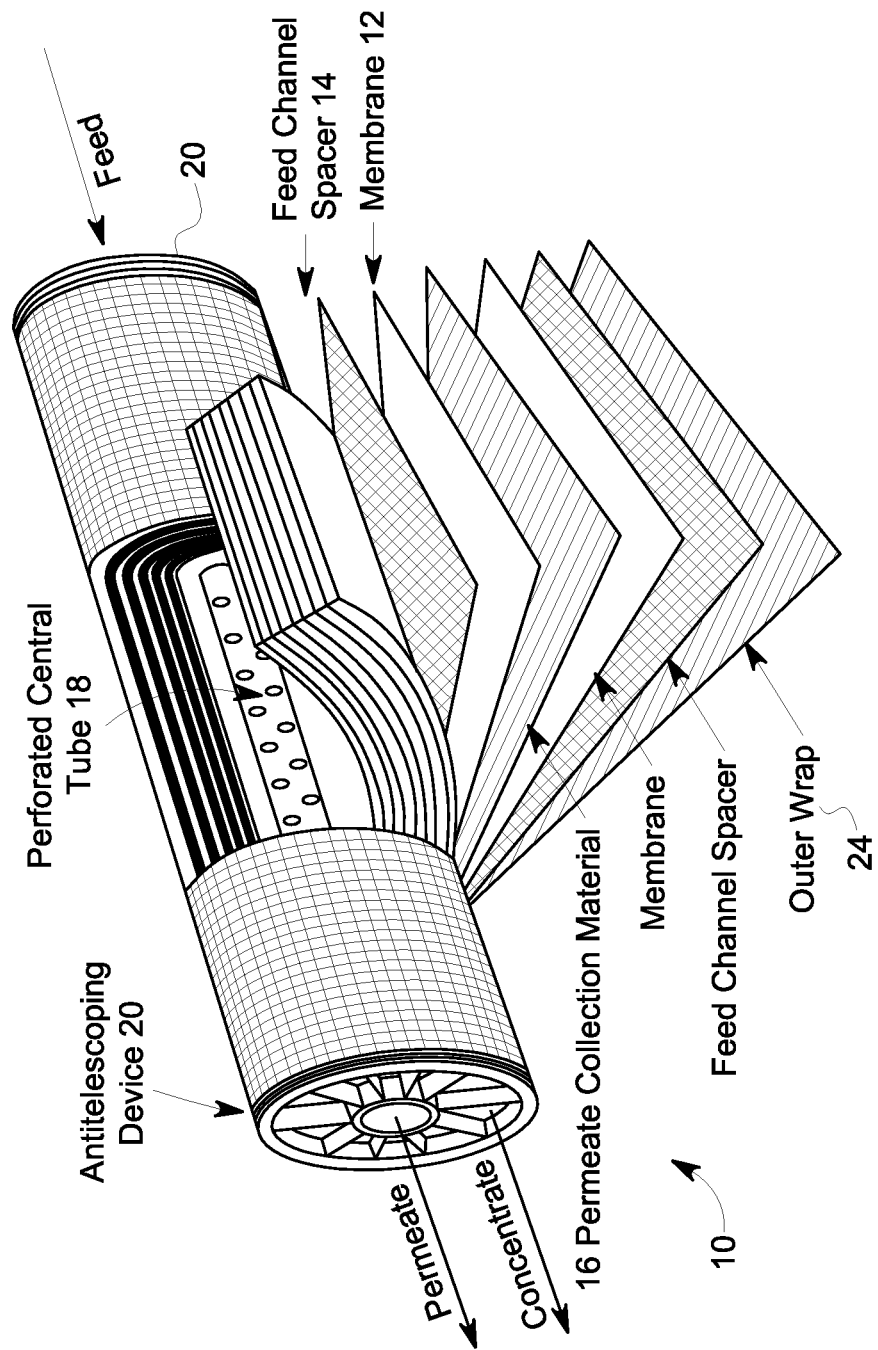

SPIRAL WOUND MEMBRANE ELEMENT FOR HIGH TEMPERATURE FILTRATION

RELATED APPLICATIONS

This application is a continuation of U.S. application Ser. No. 16/961,906, filed Jul. 13, 2020, which is a National Stage Entry of International Application No. PCT/US2019/017271, filed Feb. 8, 2019, which claims the benefit of U.S. Application Ser. No. 62/629,286, filed Feb. 12, 2018.

FIELD

This specification relates to spiral wound membrane elements or modules useful, for example, for reverse osmosis or nanofiltration, to methods and apparatus for treating high temperature fluids, and to methods and apparatus for treating produced water for re-use in a steam boiler or generator, for example in a steam assisted gravity drainage (SAGD) or other high temperature produced water treatment process.

BACKGROUND

The following discussion is not an admission that anything discussed below is citable as prior art or common general knowledge.

In various forms of oil and gas production, produced or other water streams are created that must be treated for disposal or re-use. For example, in a bitumen mining process known as Steam Assisted Gravity Drainage (SAGD), steam is produced in a boiler or generator and injected into bitumen bearing soil. The steam reduces the viscosity of the bitumen allowing a mixture of water and bitumen to flow to a production well. After this mixture is extracted, most of the oil is removed in an initial primary oil-water separation step. Other enhanced oil recovery methods used to extract heavy crude oil with steam injection, such as Cyclic Steam Stimulation (CSS) and Steam Flooding, produce similar hot mixtures of oil and water.

The water remaining after primary oil-water separation, called produced water, is hot and often alkaline with a high pH. The produced water is treated through various unit operations to make it suitable for re-use in generating steam. The produced water may contain, for example, residual oil and suspended, emulsified and dissolved solids (organic and inorganic), such as silica. The concentration of dissolved solids may be up to about 6,000 mg/L total dissolved solids (TDS) and the silica may be at or near the limit of solubility. Oil may be removed from the produced water by a second oil-water separation step such as gas flotation or a ceramic or walnut shell filter. Hot or warm lime softening may be used to remove silica and hardness. Particle filtration, for example through an anthracite bed, may be used to reduce total suspended solids. Strong or weak acid cation exchange softeners may be used to further reduce hardness.

After treatment, the produced water can be re-used to generate steam. The steam generators used in SAGD operations commonly include a Once Through Steam Generator that produces about 80% steam (vapour) and about 20% liquid droplets. The liquid fraction is removed from the steam in a blowdown stream before the steam is injected into the bitumen deposit. The OTSG blowdown water is further processed or, where permitted, disposed for example in a tailings pond or by deep well injection. In another option, the produced water is treated in an evaporator and the condensate is converted to steam in a packaged boiler. One treatment option for evaporator or boiler blowdown is to evaporate or vaporize generally pure water from the blowdown, for example in a brine concentrator or thermal crystallizer or both, to produce dried solids for disposal.

Ceramic membranes have been proposed to supplement or replace one or more treatment units in a produced water treatment system. However, ceramic membranes are generally expensive and can be difficult to clean. U.S. Pat. No. 8,940,169 describes a spiral wound membrane module suitable for use with high temperature water that is also very alkaline or has a high pH, for example SAGD produced water. The module uses a polyamide-based membrane with a polysulfone or polyethersulfone backing material. For other components, the module uses primarily one or more of, EPDM; polyamide; polyphenylene oxide; polyphenylene sulfide; polysulfone; polyethersulfone; polysulfonamide; polyvinylidene fluoride (PVDF); mylar; fiberglass; and, epoxy. In one example, a module uses a PVDF feed spacer, a nylon permeate spacer and a polysulfone center tube.

INTRODUCTION

The following introduction is intended to introduce the reader to the detailed description to follow and not to limit or define any claimed invention.

A primary purpose of the produced water treatment steps described above is to provide water of suitable quality to the steam generator. Silica and hardness in the raw produced water in particular would rapidly foul a steam generator. However, even after a two-stage process of lime softening followed by cation exchange softening, the water reaching an OTSG in an existing SAGD operation may still have near 1 mg/L of hardness. Treated produced water in an existing SAGD operation may also contain 100 to 2,000 mg/L of dissolved organics when it reaches the OTSG. As a result of the remaining contaminants in re-used produced water, a foulant layer builds up on OTSG walls over time. Further, organic and other contaminants are concentrated in blowdown water, which in some cases may impede using a crystallizer to treat the blowdown.

By using a spiral wound membrane element or module upstream of the OTSG or other boiler, either in place of or in combination with a cation exchange softener, the silica concentration, hardness and TDS of produced water can be reduced. The spiral wound membrane element may have a membrane in the ultrafiltration (UF), nanofiltration (NF) or reverse osmosis (RO) range and elements with membranes in two or more of these ranges may be placed in series. To remove hardness, a set of one or more spiral wound membrane elements preferably ends with an element with a NF or RO membrane. The very low concentration of contaminants, particularly hardness, in NF or RO permeate would reduce OTSG fouling. Using an RO membrane in particular would also allow a conventional high pressure steam boiler (i.e. a packaged boiler), with a lower blowdown ratio, to be used in place of an OTSG, without the RO permeate requiring prior treatment in an evaporator. A spiral wound membrane module may also be used to concentrate steam blowdown water, either to reduce the volume of water to be disposed of, to replace a brine concentrator, or to otherwise pre-condition blowdown water for treatment in a crystallizer.

The produced water, however, has a very high temperature and a significant concentration of silica. Because the produced water is intended for re-use to produce steam, the process is more energy efficient if the produced water is not cooled to facilitate any treatment process. The produced water may therefore move through all process steps at a temperature of 90 degrees C. or more. In addition to the high temperature, it is helpful if the modules are also stable at high pH, for example 9.5 or more, 10.5 or more, or 11.5 or more. Stability at high pH can facilitate cleaning, for example using caustic, which is preferably done at the operating temperature of 90 degrees C. or more. Operation at high pH may also inhibit silica fouling, for example by increasing the pH of the membrane feed water in a manner similar to the HERO™ process as practiced by Suez Water Technologies & Solutions for operation in high-silica waters.

A spiral wound module is described herein that is suitable for use with high temperature water, which may be produced water or another type of high temperature water. Optionally, the module may also be suitable for use with water that is alkaline or has a high pH for prolonged periods of time. For example, the module may operate at a temperature of 90 degrees C. (190 degree F.) or more and a pH of 9.5 or more, 10.5 or more or 11.5 or more. Optionally, the module is adapted to be cleaned with a hot caustic solution.

The module may be used, for example, for treating SAGD or other steam injection produced water. The module uses a combination of materials for its various components that is adapted to operate under these conditions.

The module may use membranes with a polyphenylene sulfide (PPS) backing. For example, the backing may be a non-woven fabric made of PPS fibers. To complete the membrane, an intermediate polysulfone or polyethersulfone layer may be cast on the backing. The intermediate layer may have pores in the ultrafiltration range. A further RO or NF layer is cast on the intermediate layer. For example, an RO layer may be made from a polyamide, for example by interfacial polymerization.

The feed spacer of the module may be made from polyphenylene sulfide (PPS) or ethylene chlorotrifluoroethylene (ECTFE). The permeate carrier may be made of a woven nylon (i.e. nylon 6, 6) fabric coated with high temperature epoxy. The core tube and anti-telescoping device may be made of polysulfone.

The outer cover (also called the outer wrap) may be made of fiberglass in an epoxy resin. Epoxy is also preferred over polyurethane as an adhesive inside the module. Various smaller internal components may be made of one or more of the plastics listed above, a durable rubber such as ethylene propylene diene Monomer (M-class) rubber (EPDM), or other durable materials such as mylar film.

The module may be used to filter water at high temperature and optionally high pH. For example, the module may be used at a temperature of 90° C. or more, or 100° C. or more, optionally up to 130° C. Optionally, the module may be used at a pH of 9.5 or more. In a filtration method, the module may be operated at a pressure of about 300 psi, for example 150 psi to 450 psi. The module may be operated at a generally constant pressure. The module may be used to filter produced water. Permeate from the module may be sent to a boiler, for example to produce steam for injection into a heavy oil deposit.

BRIEF DESCRIPTION OF THE FIGURES

FIG. 1 shows a partially cut away isometric view of a spiral wound module.

DETAILED DESCRIPTION

A spiral wound membrane module (alternatively called an element) can be thought of as being composed of two or more groups of materials. The first group is the membrane. The membrane is the functional component within the module that does the work of separating the feed water into filtered (permeate) and waste (brine or retentate) streams. A membrane is typically comprised of three layers of decreasing porosity starting with a fabric (i.e. nonwoven) backing, then a supporting or intermediate layer, and then a separation or membrane layer. The supporting layer may be made of polysulfone, made porous by casting a dope and forming pores by a phase-inversion process. The separation layer may be a polyamide layer made by interfacial polymerization.

A typical membrane might not fail when operated at 90° C. for a short period of time, but the lifetime of the materials can be significantly shortened by high temperature operation, especially when operating at high pH. For example, in tests by the inventors poly(butyl terephthalate) was almost dissolved and poly(ester terephthalate) was materially degraded after soaking in water at 130° C. and a pH of 9.5 for two weeks. Polyesters such as these are commonly used as membrane backing layers. In contrast, the polysulfone and polyamide layers in samples of typical membranes survived exposure to water at 130° C. and a pH of 9.5 for two weeks, as did samples of polyphenylene sulfide (PPS).

In some embodiments, a module is constructed of materials to allow operation at 90° C. or more or 100° C. of more. Optionally, the module may be constructed to allow operation at a temperature up to 130° C. Optionally the module may operate at up to a pH of 9.5 or more.

Examples of high temperature membranes were made having a non-woven backing substrate of polyphenylene sulfide. Polysulfone UF films were cast on the backing from a dope solution of 22% (wt.) polysulfone in n,n-dimethylformamide, with 1% (wt.) lithium bromide. The UF films were cast with a 0.010" gap doctor blade onto a sheet of the backing substrate that was taped to a glass plate. The cast films were submerged into a room temperature de-ionized (DI) water bath to quench. They were stored in the water bath overnight, after which the water was changed and they were stored in the water batch for about another 5 days. Casting took place under ambient conditions (room temperature, about 10% humidity) under a laboratory fume hood. After being removed from the water bath, excess water was removed from the surface of the UF films and they were coated with a polyamide RO layer.

Coupons of the membranes with PPS backing were soaked in a synthetic feed solution at 135° C. for 2 weeks in an autoclave. The feed solution contained 200 ppm sodium chloride, 20 ppm calcium chloride and 200 ppm silica and had a pH of 9.5. Samples were removed from the autoclave at the end of the first and second weeks and tested for flux (A-value) and NaCl selectivity with a crossflow test procedure.

The coupons had an average A-value of 3.79 and 46% salt passage. An A-value of 3.79 is roughly equivalent to a full-sized (8-inch diameter) element with a permeate flow of 975 LPH. This flux is reduced by about 40% from typical commercially available modules. The high salt passage is believed to be the result of pinhole defects in the coupons. It is expected that optimizing the membrane making process would likely yield improved flux and selectivity, but the coupon results demonstrate that useful membranes were produced on the PPS backing.

A second group of materials includes the feed spacers, permeate carriers, core tube and anti-telescoping device which serve to give the module structure and support while creating the flow paths for water through the module. These components are typically fabricated from commodity plastics such as polyester, polypropylene and ABS. These materials are not designed for use at elevated temperatures and may begin to fail at even moderately elevated temperatures, for example 60 or 70° C.

Examples of materials suitable for operation at high temperature, optionally above 100° C. are shown in Table 1.

TABLE 1

| Component | Material |
| --- | --- |
| Membrane | Polyamide |
| UF Support | Polysulfone or Polyethersulfone |
| Backing | PPS |
| Permeate Carrier | Epoxy-coated nylon knitted fabric |
| Feed Spacer | ECTFE or PPS |
| Core Tube | Polysulfone |
| Adhesive | Epoxy |
| ATD | Polysulfone |

Examples of module structural elements and adhesive samples were immersed in water at at 135° C. and a pH of 9.5 for a minimum of 2 weeks. Adhesive samples were configured in a lap sheer format between layers of polyester backing and tested for tensile strength. All other materials were inspected visually for changes in shape and for mass loss.

Module structural elements tested included, feed spacers made from PPS and ECTFE (HALAR™); coated PET permeate carrier; high temperature epoxies; and core tubes made of polysulfone; polyproylene and EPTFE feed spacer; and, Polyset polyurethane adhesive. All of the components survived the test.

FIG. 1 shows a spiral wound membrane module 10. One primary component is the separation membrane 12, which is formed into a flat sheet. Other primary internal components are a feed channel spacer 14, a permeate spacer (or permeate collection material) 16, a permeate collection tube or center tube 18 and an end surface holder or anti-telescoping device 20 at each end of the module 10. The membrane 12 is arranged to form an envelope around the permeate spacer 16. The edges of the envelope are sealed except that at an inside edge the permeate spacer 16 is open to perforations 22 of the center tube 18. The feed channel spacer 14 is placed over the envelope. The envelope and feed channel spacer 14 are wound around the center tube 18. Feed water can access the surface of the membrane 12 by flowing into the edge of and across the feed channel spacer 14. Permeate passes through the membrane 12, then flows through the permeate spacer 16 and center tube 18 to leave the module 10. Concentrate flows out of the downstream edge of the feed channel spacer 14 to leave the module. The anti-telescoping devices 20 are glued or taped to the center tube 18 and also held in place by an outer wrap 24. The anti-telescoping devices 20 prevent the envelopes from being pushed along the length of the center tube 18 by the feed water. An outer wrap 24 surrounds the envelopes to keep them from unwinding in use.

One or more of various other components may also be present in the module 10. For example, the membrane 12 typically comprises a membrane support or backing layer. The envelopes may be sealed with an adhesive. In a multistage module, two or more center tubes 18 may be connected in series by element interconnectors. The module typically has O-rings, brine seals or other end-seal gaskets and other seals. Folds in the envelope may be reinforced with a tape or film. A film or tape may also be used to provide an inner wrap. Tape may also be used to help hold the anti-telescoping devices 20 in place.

The membrane 12 may be a polyamide-based membrane with a backing material of, for example, PPS. The backing material may be coated with an intermediate layer of polysulfone or polyethersulfone, made porous by a phase inversion process. Thereafter, the surface of the coated backing material is coated with a reverse osmosis or nanofiltration membrane.

In other components, the membrane module 10 makes use of one or more of the following materials, or blends of the following materials: polyamide (PA, nylon); polyphenylene oxide (PPO, NORYL™); polyphenylene sulfide (PPS); polysulfone (PSO); polyethersulfone (PES); polysulfonamide; and, polyvinylidene fluoride (PVDF), EPDM, fiberglass, epoxy and mylar. Polypropylene may be used in minor components such as a backing for a tape.

In an example of a spiral would module 10 intended for use in treating SAGD or other high temperature produced water. The feed channel spacer 14 is made of PPS or ethylene chlorotrifluoroethylene (ECTFE). The permeate spacer 16 is made from a knitted yarn of nylon 6-6 and epoxy. Epoxy is used for an adhesive in other parts of the module 10. The center tube 18 is extruded from polysulfone. An element interconnector is also extruded from polysulfone. The anti-telescoping device 20 is injection molded from polysulfone. The outer wrap 24 is made of fiber-reinforced plastic, for example fiberglass embedded in epoxy. An inner wrap is made from a polypropylene backed pressure sensitive adhesive (PSA) tape. The same tape is used on other parts of the module 10 requiring tape. Creased mylar film is used for a fold reinforcement. A concentrate seal and O-rings are made from molded EPDM rubber.

Optionally, the center tube of the module 10 may be provided with 3 or more rows of holes having a diameter of 0.1" or less, or perforations of other shapes having an equivalent area, for example 4 rows of 0.063" diameter holes. The module 10 may also be rolled under a tension of 20 psig or more, for example about 25 psig. The central tube 18 is mounted in a driven chuck assembly that is first used to roll up all of the leaves or elements of the module. Inner wrap tape is then wrapped around the element. The tension of the tape inner wrap is controlled by the tension at which the tape is allowed to unwind from a roll that it is mounted on. The tension and numerous small holes assist the heated materials in resisting mechanical stresses.

While the module as described above is suitable for use in service with water having a high temperature and pH, it may also be used with water under other conditions. The ability of the module to withstand extreme conditions can also be used when cleaning the module. In particular, the module may be cleaned with a hot caustic solution, for example a highly concentrated and heated solution of NaOH. The solution may be used, for example, according to known clean in place procedures. However, due to an increased reaction rate relative to typical cleaning solutions, one or more of the time, energy, water, or other consumables required for cleaning may be reduced.

U.S. Pat. No. 8,940,169 is incorporated herein by reference.

We claim:

1. A spiral wound membrane module comprising, a membrane envelope comprising a membrane and a permeate spacer; a feed spacer adjacent the membrane envelope; a center tube, wherein the membrane envelope and the feed spacer are wrapped around the center tube; and, an anti-telescoping device attached to the center tube beside the membrane envelope and the feed spacer, wherein the feed spacer comprises ethylene chlorotrifluoroethylene, wherein the permeate spacer comprises a nylon fabric coated with epoxy.

2. The spiral wound membrane module of claim 1 wherein the membrane comprises a polyphenylene sulfide backing.

3. A spiral wound membrane module comprising, a membrane envelope comprising a membrane and a permeate spacer; a feed spacer adjacent the membrane envelope; a center tube, wherein the membrane envelope and the feed spacer are wrapped around the center tube; and, an anti-telescoping device attached to the center tube beside the membrane envelope and the feed spacer, wherein the membrane comprises a polyphenylene sulfide backing, wherein the membrane further comprises an intermediate polyethersulfone layer.

4. The membrane module of claim 3 wherein the membrane further comprises a polyamide separation layer.

5. The membrane module of claim 3 wherein the feed spacer comprises ethylene chlorotrifluoroethylene or polyphenylene sulfide.

6. The membrane module of claim 4 wherein the feed spacer comprises ethylene chlorotrifluoroethylene or polyphenylene sulfide.

7. A spiral wound membrane module comprising, a membrane envelope comprising a membrane and a permeate spacer; a feed spacer adjacent the membrane envelope; a center tube, wherein the membrane envelope and the feed spacer are wrapped around the center tube; and, an anti-telescoping device attached to the center tube beside the membrane envelope and the feed spacer, wherein the membrane comprises a polyphenylene sulfide backing and the feed spacer comprises ethylene chlorotrifluoroethylene or polyphenylene sulfide, wherein the permeate spacer comprises a nylon fabric coated with epoxy.

8. The membrane module of claim 7 wherein the center tube is made of polysulfone.

9. The membrane module of claim 8 wherein the anti-telescoping device is made of polysulfone.

10. A filtration process comprising steps of,
providing a membrane module according to claim 1; and,
feeding water to the membrane module at a temperature in the range of 90° C. to 130° C.

11. A filtration process comprising steps of,
providing a membrane module according to claim 1; and,
feeding water to the membrane module at a temperature above 100° C.

12. A filtration process comprising steps of,
providing a membrane module according to claim 1; and,
feeding water to the membrane module at a pH of 9.5 or more.

13. A filtration process comprising steps of,
providing a membrane module according to claim 1; and,
feeding produced water to the membrane module.

14. A filtration process comprising steps of,
providing a membrane module according to claim 1; and,
feeding water to the module at a pressure in the range of 150 psi to 450 psi.

15. A filtration process comprising steps of,
providing a membrane module according to claim 1; and,
feeding water to the module at a constant pressure.

16. The membrane module of claim 1 wherein the membrane comprises an intermediate polyethersulfone layer.

17. The membrane module of claim 1 wherein the membrane comprises a polyamide separation layer.

18. The membrane module of claim 3 wherein the permeate carrier comprises a nylon fabric coated with epoxy.

19. The membrane module of claim 7 wherein the membrane comprises an intermediate polyethersulfone layer.

20. The membrane module of claim 7 wherein the membrane further comprises a polyamide separation layer.

* * * * *